United States Patent
Hsu et al.

(10) Patent No.: US 8,082,368 B2
(45) Date of Patent: Dec. 20, 2011

(54) DISPLAY DEVICE FOR INDICATING CONNECTION STATUSES OF A COMMUNICATION CHANNEL PROVIDED BETWEEN TWO SYSTEMS AND METHOD THEREOF

(75) Inventors: Mien-Wen Hsu, Tucheng (TW);
Chen-Cheng Lin, Sijhih (TW);
Ying-Wen Lin, Taipei (TW)

(73) Assignee: Infortrend Technology, Inc., Taipei Hsien (TW)

( * ) Notice: Subject to any disclaimer, the term of this patent is extended or adjusted under 35 U.S.C. 154(b) by 915 days.

(21) Appl. No.: 11/408,034

(22) Filed: Apr. 21, 2006

(65) Prior Publication Data

US 2007/0260734 A1    Nov. 8, 2007

(51) Int. Cl.
*G06F 15/16* (2006.01)
*G06F 15/173* (2006.01)

(52) U.S. Cl. .................. 709/250; 709/223; 709/224
(58) Field of Classification Search .......... 709/250, 709/227–228, 223–224
See application file for complete search history.

(56) References Cited

U.S. PATENT DOCUMENTS

| | | | | |
|---|---|---|---|---|
| 4,964,065 A * | 10/1990 | Hicks et al. | | 709/226 |
| 5,701,411 A * | 12/1997 | Tran et al. | | 709/250 |
| 6,167,403 A * | 12/2000 | Whitmire et al. | | 709/223 |
| 6,473,811 B1 * | 10/2002 | Onsen | | 710/15 |
| 6,584,418 B2 * | 6/2003 | Murphy et al. | | 702/60 |
| 6,829,252 B1 * | 12/2004 | Lewin et al. | | 370/493 |
| 7,447,935 B2 * | 11/2008 | Chen | | 714/6.1 |
| 7,612,470 B2 * | 11/2009 | Pincu et al. | | 307/85 |
| 2002/0129098 A1 * | 9/2002 | Stone et al. | | 709/203 |
| 2002/0173278 A1 * | 11/2002 | Fritz et al. | | 455/90 |
| 2005/0021881 A1 * | 1/2005 | Asano et al. | | 710/19 |
| 2005/0108376 A1 * | 5/2005 | Deval et al. | | 709/223 |
| 2005/0114496 A1 * | 5/2005 | Fang et al. | | 709/224 |
| 2005/0182876 A1 * | 8/2005 | Kim et al. | | 710/100 |
| 2005/0216589 A1 * | 9/2005 | Kortum et al. | | 709/225 |
| 2006/0038506 A1 * | 2/2006 | Rose et al. | | 315/247 |
| 2006/0061369 A1 * | 3/2006 | Marks et al. | | 324/542 |
| 2006/0236376 A1 * | 10/2006 | Liu et al. | | 726/4 |
| 2006/0255813 A1 * | 11/2006 | Rispoli et al. | | 324/691 |
| 2007/0070885 A1 * | 3/2007 | Uddenberg et al. | | 370/225 |
| 2008/0030362 A1 * | 2/2008 | Huang et al. | | 340/815.45 |

* cited by examiner

*Primary Examiner* — Joshua Joo
(74) *Attorney, Agent, or Firm* — Rosenberg, Klein & Lee

(57) ABSTRACT

A display device for indicating connection statuses of a communication channel between two systems is disclosed, the communication channel having a plurality of communication links. The display device comprises a detecting circuit coupled to the communication channel for detecting a plurality of link statuses of the communication links; an indicator controller coupled to the detecting circuit for determining the connection statuses of the communication channel according to the link statuses; and an LED indicator coupled to the indicator controller for displaying in a plurality of statuses according to the connection statuses from the indicator controller; wherein the connection statuses comprise a first connection status indicating that all the link statuses are "ON", a second connection status indicating that all the link statuses are "OFF", and a third connection status indicating that at least one of the link statuses is "ON" and at least one of the link statuses is "OFF".

27 Claims, 5 Drawing Sheets

DISPLAY DEVICE FOR INDICATING CONNECTION STATUSES OF A COMMUNICATION CHANNEL PROVIDED BETWEEN TWO SYSTEMS AND METHOD THEREOF

BACKGROUND OF THE INVENTION

1. Field of the Invention

The present invention relates to a display device for indicating connection statuses of a communication channel, and more particularly, to a display device for indicating connection statuses of a communication channel provided between two systems, wherein the communication channel has a plurality of communication links.

2. Description of Related Art

With developments of computer systems, database systems, and the Internet, there are more and more important systems which must be connected so as to form a communication channel to communicate signals with each other through the communication channel for performing some specific tasks or for certain goals between two systems. On the other hand, without the communication channel between the two systems, the two systems would not be able to perform a coordination task at the same time. Generally, a cable always plays an important role in the communication channel between two systems. That is, the cable is usually used as an electrical or optical connection media and a main portion of the communication channel between two systems. For a conventional cable connected between the two systems, there are only two statuses for a communication channel comprising "good/ON" when the communication channel is OK for signal transmission between the two systems connected by it, and "bad/OFF" when the communication channel is not OK for signal transmission between the two systems connected by it because of certain abnormality such as cable disruption. When there is a third channel status occurred, there is no way to indicate such a third status through the conventional display unit. Therefore, there is a need for a channel status display device which may indicate a third channel status other than the "good/ON" or "bad/OFF" status.

SUMMARY OF THE INVENTION

For a new type of communication channel used to be connected between two systems, a plurality of communication links are provided in the communication channel, and each link can be in one of the two statuses: "bad (OFF)", "good (ON)". Therefore, there can be three connection statuses of the communication channel: first, "ALL ON"—all the communication links in the communication channel are "ON", second, "ALL OFF"—all the communication links in the communication channel are "OFF", and third, "PARTIAL ON"—a portion of the communication links in the communication channel is "ON" while the rest of the portion is "OFF".

It is an object of the present invention to provide a display device for indicating three connection statuses of a communication channel provided between two systems.

It is an object of the present invention to provide a method for indicating three connection statuses of a communication channel provided between two systems.

In the preferred embodiment of the present invention, the display device for indicating the connection statuses of the communication channel provided between the two systems, the communication channel having a plurality of communication links therein, the display device comprising: a detecting circuit coupled to the communication channel for detecting a plurality of link statuses of the communication links; an indicator controller coupled to the detecting circuit for determining the connection statuses of the communication channel according to the link statuses; and an LED (light emitting diode) indicator coupled to the indicator controller for displaying a plurality of statuses according to the connection statuses from the indicator controller; wherein the connection statuses comprise a first connection status indicating that all the link statuses are "ON", a second connection status indicating that all the link statuses are "OFF", and a third connection status indicating that at least one of the link statuses is "ON" and at least one of the link statuses is "OFF".

In the preferred embodiment of the present invention, a method for indicating connection statuses of a communication channel provided between two systems, the communication channel having a plurality of communication links therein. The method comprises the steps of: a detecting circuit detecting a plurality of link statuses of the communication links regularly; an indicator controller determining the connection statuses according to the link statuses from the detecting circuit; and an LED indicator displaying a plurality of statuses according to the connection statuses from the indicator controller; wherein the connection statuses comprise a first connection status indicating that all the link statuses are "ON", a second connection status indicating that all the link statuses are "OFF", and a third connection status indicating that at least one of the link statuses is "ON" and at least one of the link statuses is "OFF".

BRIEF DESCRIPTION OF THE DRAWINGS

The present invention will now be specified with reference to its preferred embodiment illustrated in the drawings, in which.

DESCRIPTION OF THE PREFERRED EMBODIMENTS

Figure 1:
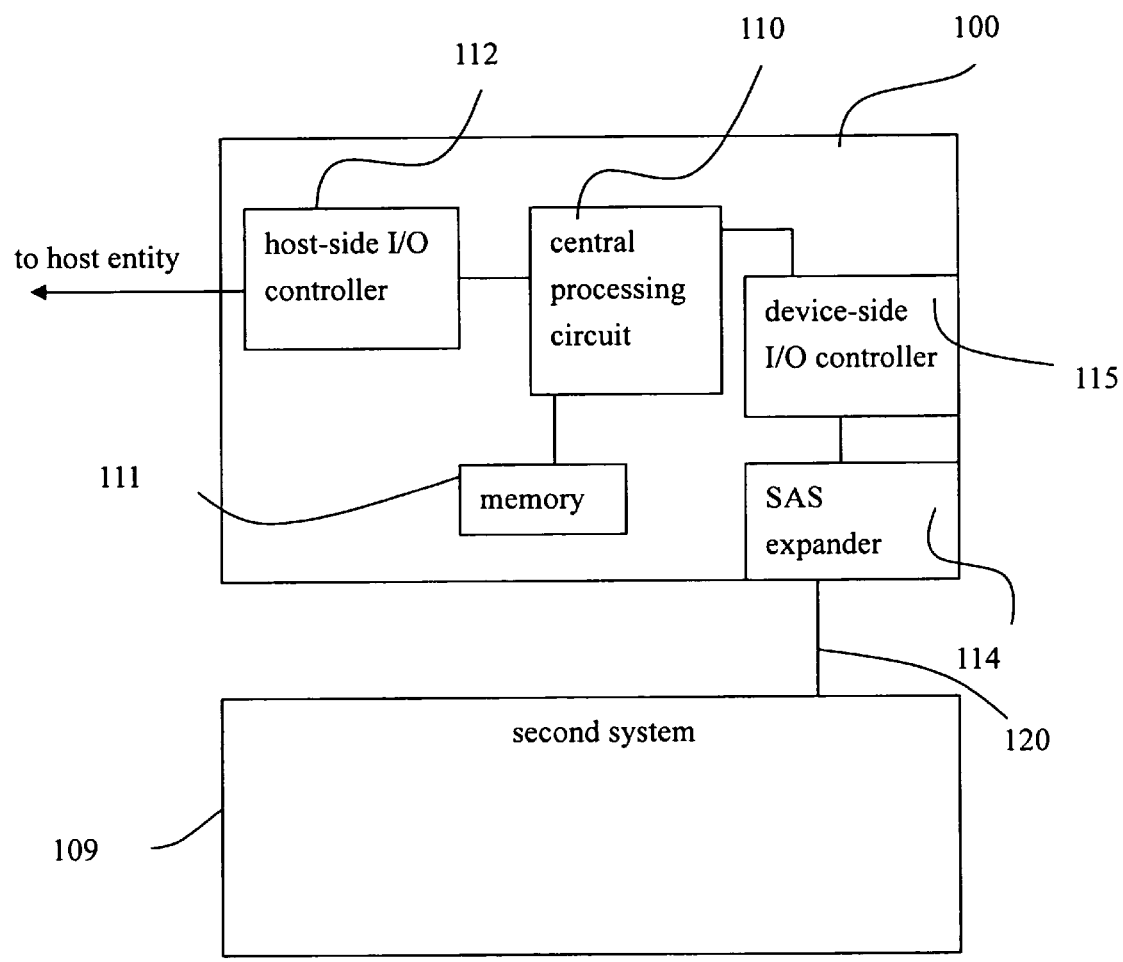
FIG. 1 is a system block diagram that shows there is a cable provided between two systems through a device-side I/O controller.

Please refer to FIG. 1, which is a system block diagram showing that a first system 100 and a second system 109 are connected with a cable 120.

In the present embodiment, the first system 100 is a RAID (redundant array of independent disk) system, and the second system is a JBOD (just a bundle of drives) system. The first system 100 comprises a host-side I/O controller 112, a CPC (central processing circuit) 110, a memory 111, a SAS device-side I/O controller 115, and a SAS expander 114. Although illustrated in separate functional blocks, two or more or even all of there functional blocks can be incorporated into one chip in practical implementation. For example, the SAS expander 114 can be incorporated into the SAS device-side I/O controller 115 to be an integrated circuit (IC).

The CPC 110 comprises a CPU (central processing unit) (not shown) and a chipset (not shown) that is connected to the CPU. The CPU can be, for example, a Power PC. The chipset mainly comprises a parity engine, CPU interface, memory controller altogether for communicating data signals and controls the signals among them. The host-side I/O controller 112 is connected between a host entity (not shown) and the CPC 110. The host-side I/O controller 112 is an interface and a buffer between the first system 100 and the host entity (not shown), and receives I/O requests and related data from the host device, and maps, and/or transfers them to the CPC 110. In the present embodiment, the host entity can be a host computer, either a server or a workstation, or even a personal computer. In an alternate embodiment, the host entity can be another separate RAID controller functioning as a host entity with respect to the present RAID controller.

When the CPC 110 receives the I/O request of the host device from the host-side I/O controller 112, the CPC 110 parses and performs some operations in response to the I/O request, and sends the data requested and/or reports and/or information back to the host device through the host-side I/O controller 112.

The memory 111 is connected to the CPC 110 and acts as a buffer therefor to buffer the data transferred between the host device and the second system 109 passing the CPC 110. In one embodiment, the memory 111 can be a DRAM; more particularly, the DRAM can be a SDRAM. The device-side I/O controller 115 is an interface and buffer between the first system 100 and the second system 109 and/or data storage devices such as hard disk drives (not shown), and receives I/O requests and related data issued from the CPC 110 and maps and/or transfers them to the second system 109 and/or data storage devices (not shown). The device-side I/O controller 115 re-formats the data and control signals received from the CPC 110 to comply with SAS protocol and transmits them to the second system 109. The SAS expander 114 is optional. When the SAS expander 114 is provided as the present embodiment, either inside or outside of the device-side I/O controller 108, through the SAS expander 114 that is connected to the device-side I/O controller 115, more SAS hard disk drives can be attached to the device-side I/O controller 115 to expand the capacity of the storage system. In an alternate embodiment, the SAS expander 114 can be omitted, and the SAS disk drives can be directly attached to the device-side I/O controller 115.

Figure 2A:
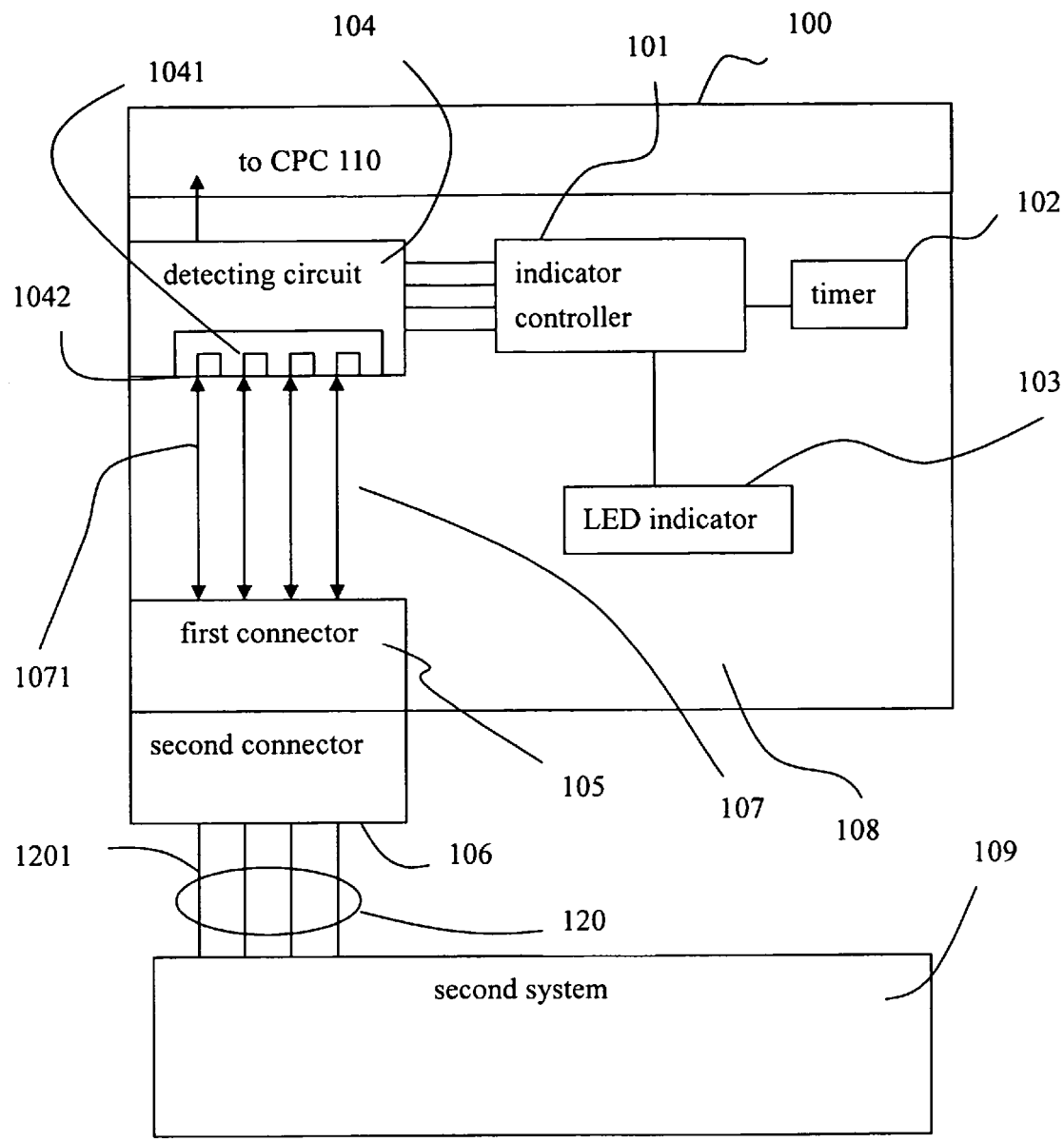
FIGS. 2A and 2B are system block diagrams that show a first embodiment and a second embodiment of the present invention.

Please refer to FIG. 2A showing a first embodiment of display device 108 for indicating communication channel connection statuses of the present invention, wherein the display device 108 for indicating communication channel connection statuses between the first system 100 and the second system 109 is provided in the first system 100. The second system 109 is connected to the first system 100 via a cable 120 having a second connector 106 connected to a first connector 105 of the first system 100. The display device 108 for indicating the connection statuses of a communication channel 107 provided between the two systems comprises a detecting circuit 104 coupled to the communication channel 107 for detecting the link statuses of the communication links 1071, an indicator controller 101 coupled to the detecting circuit 104 for determining the connection statuses of the communication channel 107 according to the link statuses, and an LED indicator 103 coupled to the indicator controller 101 for displaying the connection statuses from the indicator controller 101.

In the embodiment shown in FIG. 2A, the detecting circuit 104 can be a SAS I/O controller 108, such as the IC No. 1068 of LSI corporation or the IC No. 9410 of Adptec corporation, or a SAS expander 114, such as the IC No.VSC 7153 of Vitesse corporation. According to the SAS protocol, a SAS port 1041 may contain one or more PHYs 1042. It can be a "wide" port if there is more than one PHY 1042 in the port 1041, or a "narrow" port 1041 if there is only one PHY 1042 therein; in other words, the SAS wide port 1041 comprises a plurality of SAS PHYs 1042. The SAS I/O controller 108/ SAS expander 114 comprises a SAS port 1041 including a plurality of SAS PHYs 1042, i.e., a SAS wide port.

In the present embodiment, 4 PHYs 1042 are provided in the wide port 1041. Each of the SAS PHYs 1042 in the wide port 1041 has a corresponding internal communication link 1071 connected to the first connector 105.

The cable 120 comprises a plurality of communication links 1201 therein, hereinafter referred to cable communication links 1201, each for connecting to one of the internal communication links 1071. A communication link comprises one of the cable communication links 1201 in the cable 120, and in each of the two systems between the ports, one of the internal communication links 1071, if internal communication links 1071 exists between the cable connector 105 and SAS port 1041 of either of the systems 100, 109.

A communication link 1071 has its rated bandwidth. Since a wide port comprises a plurality of PHYs 1042, when a communication channel 107 is built between two wide ports of the two systems, a plurality of communication links 1071 are built in a communication channel 107, which scales up the bandwidth of the communication channel 107 to an aggregated bandwidth of the communication links 1071, and theoretically is proportional to the number of links in the communication channel. When the system 100 is on-line, between two SAS PHYs 1042 connected by a communication link 1071, one of the two link status of "good/ON" and "bad/OFF" can be detected by the detecting circuit 104. The detecting circuit 104 may detect the link statuses of the communication links 1071 periodically or otherwise. The link statuses of the communication links 1071 can then be transmitted to the indicator controller 101, and used for determining the connection statuses of the communication channel 107. The channel connection statuses comprise a first connection status, "ALL-ON" status, indicating that all the link statuses are "ON", a second connection status, "ALL-OFF" status, indicating that all the link statuses are "OFF", and a third connection status, "PARTIAL ON" status, indicating that at least one of the link statuses is "ON" and at least one of the link statuses is "OFF".

When one or more of the links 1071 in the communication channel 107 is in a "bad" status while some other link is still in a "good" status, however, the communication channel 107 still works, but with a narrower bandwidth than that of a channel, wherein all of its communication links are in a "good" status. Therefore, the communication channel 107 is in its full bandwidth when the connection status thereof is "ALL-ON", and in a zero bandwidth thereof when the connection status thereof is "ALL-OFF", which means that no communication link 1071 is in a "good" status for signal transmission, and in a partial bandwidth thereof when the connection status thereof is "PARTIAL-ON", which means that only a portion of the communication links 1071 are in a "good" status for signal transmission. When the connection status of the communication channel 107 is determined by the indicator controller 101, it is transmitted to the LED indicator 103 for displaying.

If all the link statuses of the communication links 1071 between the two systems 100, 109 are in a workable connection status for signal transmission, i.e., "ON" status, then the detecting device 104 that detects the link statuses of the communication links 1071 will detect that the link statuses of all the communication links 1071 are "ON", and transmit the link statuses "ON" of the communication links 1071 to the indicator controller 101. The indicator controller 101 can be a micro processing unit or a PLD (programmable logic device). The indicator controller 101 will determine the connection statuses of the communication channel 107 to be "ALL-ON" according to all the link statuses "ON" from the detecting circuit 104, and an LED indicator "ON" signal is generated to switch or keep the LED indicator 103 on for displaying the connection status "ALL-ON" from the indicator controller 101.

On the contrary, if none of the link statuses of the communication links 1071 between the two system 100, 109 are in a workable connection status for signal transmission because of certain abnormality, i.e., "OFF" status, then the detecting device 104 that detects the link statuses of the communication links 1071 will detect that all the link statuses of he communication links 1071 are "OFF" and transmit the link statuses "OFF" of the communication links 1071 to the indicator controller 101. After receiving all the link statuses "OFF", the indicator controller 101 determines the connection statuses of the communication channel 107 to be "ALL-OFF" according to the link statuses "OFF" from the detecting circuit 104, and an LED indicator "OFF" signal is generated to switch or keep the LED indicator 103 off for displaying the connection status the connection status "ALL-OFF" from the indicator controller 101.

Furthermore, if at least one of the link statuses of the communication links 1071 between the two system 100, 109 is in a workable connection status for signal transmission, i.e., "ON", and at least one of the link statuses of the communication links 1071 is not in a workable connection status for signal transmission, i.e., "OFF", then the detecting device 104 that detects the link statuses of the communication links 1071 will detect that a portion of (one or more) the link statuses of the communication links 1071 are "ON" and the rest portion of (one or more) the link statuses are "OFF", and transmit the link statuses of the communication links 1071 to the indicator controller 101. The indicator controller 101 determines the connection status of the communication channel 107 to be "PARTIAL ON" according to the link statuses including both "ON" and "OFF" from the detecting circuit 104, and an LED indicator blinking signal is generated to keep the LED indicator 103 blinking for displaying the connection statuses "PARTIAL ON". The blinking of the LED indicator 103 is controlled by a timer 102 coupled to the indicator controller 101 for controlling the blinking of the LED indicator 103, in which the timer 102 can be an IC NO. NE555 that is produced by several manufacturers. In other words, the first connection status, the second connection status and the third connection status of the communication channel 107 are represented by three different statuses of the LED indicator, so that the user can know the three connection statuses of the communication channel 107 through seeing "ON", "OFF" or "blinking" of the LED indicator 103.

Figure 2B:
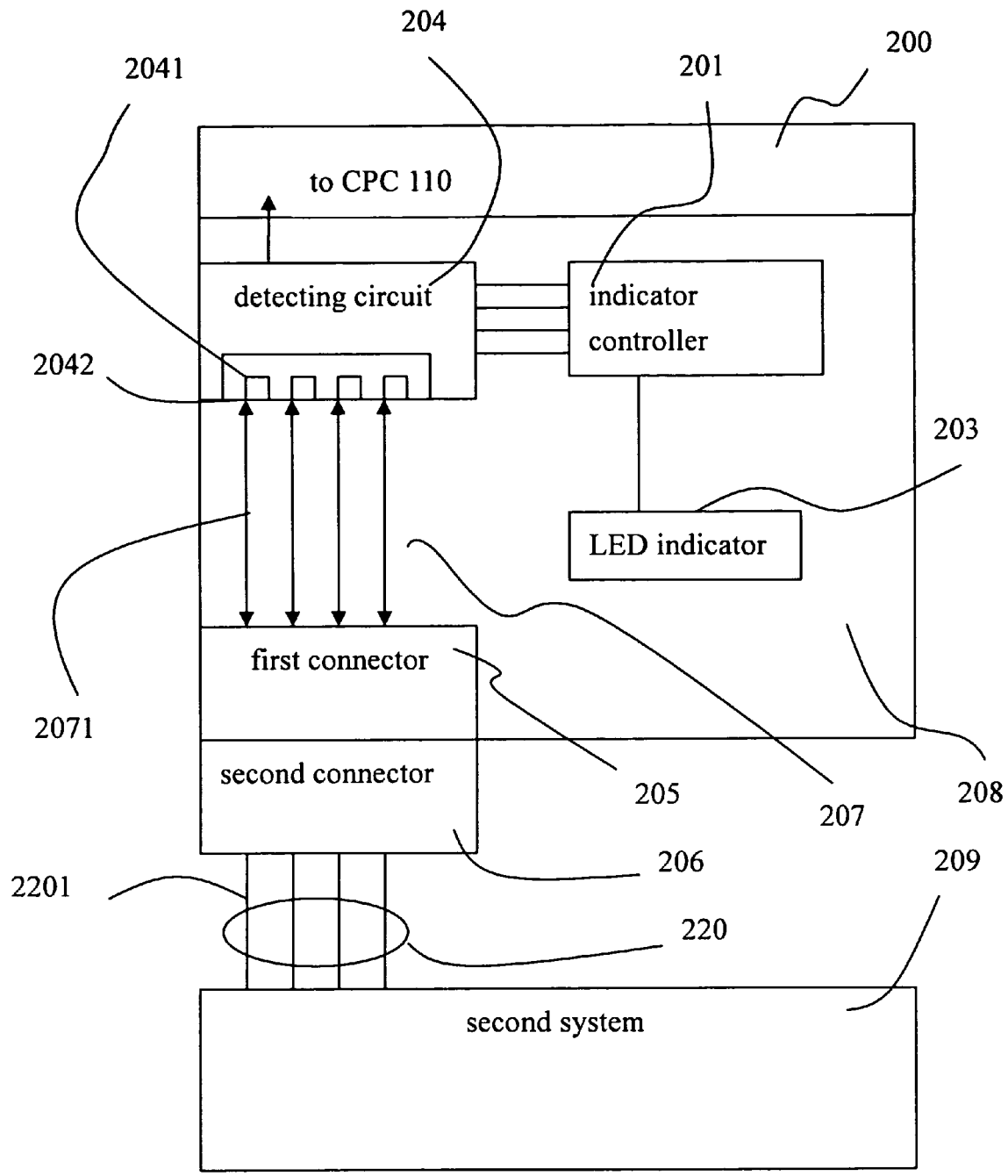

Please refer to FIG. 2B which is a system block diagram showing a second embodiment of the present invention. The primary difference between the first embodiment and the second embodiment is that in the second embodiment there is no timer 102 coupled to the indicator controller 101 for controlling the blinking of the LED indicator 103; however, the LED indicator 203 may emit lights of different colors to indicate different statuses of the communication channel 207. In one embodiment of LED indicator, the LED indicator 203 comprises an LED chip that can emit lights of three or more different colors due to, for example, potential difference across its two terminals. When the indicator controller 201 determines the connection status of the communication channel 207 to be a first connection status, such as "ALL-ON", a first signal is generated to produce a first potential difference across the LED terminals, wherein the first potential difference makes the LED chip emit a first color light. When the indicator controller 101 determines the connection status of the communication channel 107 to be a second connection status, such as "ALL-OFF", a second signal is generated to produce a second potential difference across the LED terminals, wherein the second potential difference makes the LED chip emit a second color light. When the indicator controller 101 determines the connection status of the communication channel 107 to be a third connection status, such as "PARTIAL-ON", a third signal is generated to produce a third potential difference across the LED terminals, wherein the third potential difference makes the LED chip emit a third color light.

In other words, the first connection status, the second connection status and the third connection status of the communication channel 207 are indicated by three different colors of the LED indicator 203, so that the user can know the three connection statuses of the communication channel 107 through seeing different colors emitted from the LED indicator 203. In an alternate embodiment of the LED indicator, the LED indicator 203 can be an LED lamp including three LED chips, each of which may emit a different color. Other elements of the second embodiment of the present invention are identical to those of the first embodiment; therefore, the detailed descriptions are omitted.

Although in the embodiments shown in FIGS. 2A and 2B, the detecting circuit 104 is a SAS I/O controller or a SAS expander, in an alternate embodiment, the detecting circuit 104 can be a detecting unit other than the SAS I/O controller and the SAS expander but attached to the SAS I/O controller or the SAS expander.

In the previous embodiments, the display device 108 is provided in the first system in which the SAS protocol is used and a SAS device-side I/O controller 108 is used in the first system as the device-side I/O controller with or without a SAS expander 114 added for communicating with the second system. In an alternate embodiment, the display device is provided in a first system in which a protocol other than SAS protocol is used to provide a communication channel including a plurality of communication links therein to connect to a second system, wherein the communication channel includes three connection status to display. In addition, the I/O controller used can be an I/O controller other than the SAS I/O controller.

Figure 3A:
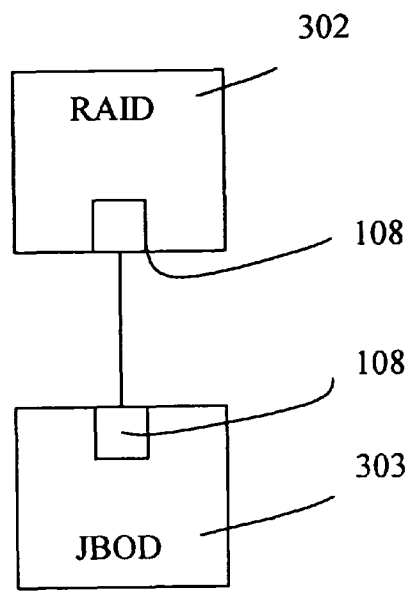
FIG. 3A to FIG. 3E show the systems to which the display devices of the present invention are applied.

Please refer to FIG. 3A to FIG. 3E which show the two system 100, 109, both of which have the display devices 108. In FIG. 3A, the two systems 100, 109 are the RAID system 302 and the JBOD system 303. The RAID system 302 has been explained in details in FIG. 1. The JBOD system 303 has a JBOD emulator controller (not shown) for connecting with a host entity such as a host computer system or a RAID system or with a system that data passing through such as another JBOD system and for receiving or handling or passing data received. The display device 108 can be provided in JBOD emulator controller to detect the connection status of the communication channel between JBOD emulator controller and the RAID system.

Figure 3B:
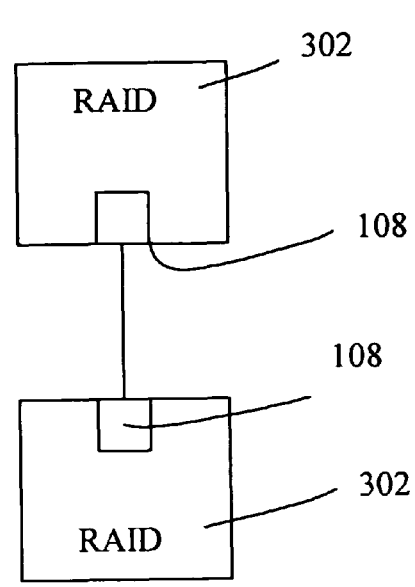
Figure 3C:
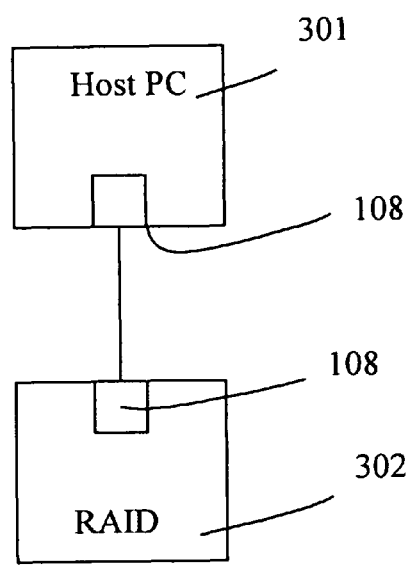
Figure 3D:
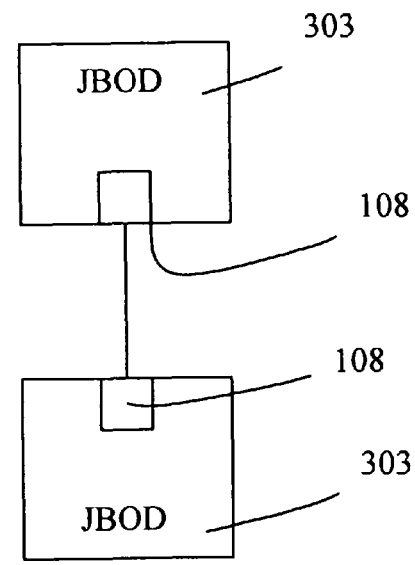
Figure 3E:
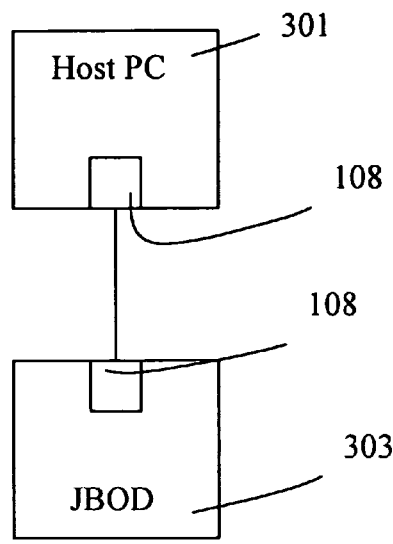

In FIG. 3B, the two systems 100, 109 can be the two RAID systems 302, both of which have the display devices 108. In FIG. 3C, the two systems 100, 109 can be a host computer system 301 and the RAID system 302, both of which have the display devices 108. The host computer system 301 may have an HBA (Host Bus Adapter) card (not shown) provided therein for connecting with the RAID system. The display device 108 can be provided in the HBA card to detect the connection status of the communication channel between the HBA card and the RAID system 302. Please note that in this connection arrangement, the host computer system 301 is connected to the host-side I/O controller of the RAID system and thus the display device 108 is provided in the host-side I/O controller of the RAID system. In FIG. 3D, the two systems 100, 109 can be the two JBOD systems 303, both of which have the display devices 108. In FIG. 3E, the two systems 100, 109 can be the host PC 301 and the JBOD system 303, both of which have the display devices 108.

Figure 4:
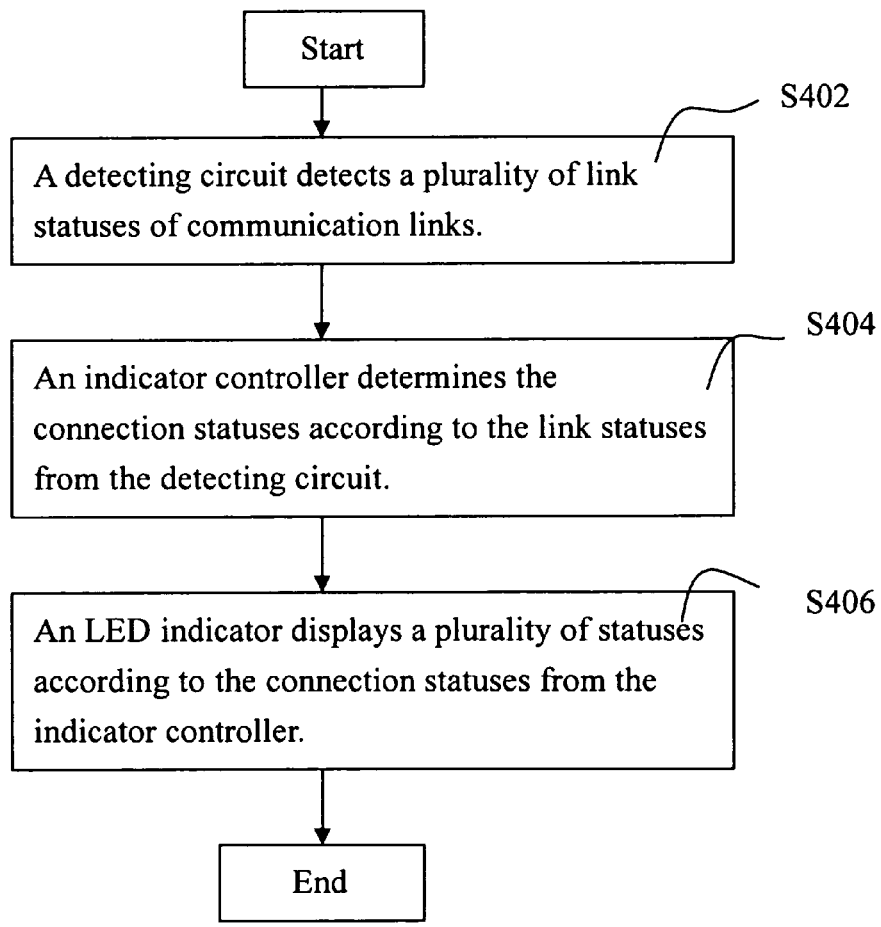
FIG. 4 is a flowchart that shows the steps of the method of the present invention.

Please refer to FIG. 4 which is a flowchart showing the steps of the method of the present invention. The method comprises the steps of: a detecting circuit detecting a plurality of link statuses of the communication links (S402); an indicator controller determining the connection statuses of the communication channel according to the link statuses from the detecting circuit (S404); and an LED indicator displaying different statuses according to the connection statuses from the indicator controller (S406); wherein the connection statuses comprise a first connection status indicating that all the link statuses are "ON", a second connection status indicating that all the link statuses are "OFF", and a third connection status indicating that at least one of the link statuses is "ON" and at least one of the link statuses is "OFF".

In the step (S402), when the two systems 100 and 109 are connected, the detecting circuit will detect the link statuses of all the communication links 1071. The detected link status of each of the communication links 1071 is either "ON" or "OFF", as mentioned earlier. Then the detecting device 104 will transmit all the link statuses of the communication links 1071 to the indicator controller 101.

In the step (S404), after receiving the link statuses of the communication links 1071, the indicator controller 101 will determine the connection statuses of the communication channel 107 according to the link statuses from the detecting circuit 104, and the indicator controller 101 will transmit the LED indicator signal that can indicate the connection statuses—"ALL-ON", "ALL-OFF" or "PARTIAL-ON"—to the LED indicator 103, as mentioned earlier.

In the step (S406), after receiving the connection statuses, the LED indicator 103 will display different statuses according to the connection statuses from the indicator controller 101. In the first embodiment, the LED indicator 103 will be of "ON", "OFF" or "blinking" status to indicate the three connection statuses of the communication channel 107. On the other hand, in the second embodiment, the LED indicator 203 will become different colors to indicate the three connection statuses of the communication channel 207.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A display device for indicating connection statuses of a communication channel provided between two systems, the communication channel having a plurality of PHY portions defining a plurality of communication links therein, the display device comprising:

a detecting circuit coupled to the communication channel for detecting a plurality of link statuses of the communication links, the detecting circuit thereby monitoring a link status of each communication link one independent of the other, wherein the communication channel comprises a plurality of connection statuses including: a first connection status indicating an "ON" state for all the link statuses, a second connection status indicating an "OFF" state for all the link statuses, and a third connection status indicating an "ON" state for at least one of the link statuses and an "OFF" state for at least one other of the link statuses;

an light emitting diode (LED) indicator controller coupled to the detecting circuit for determining the connection statuses of the communication channel according to independent variations of the link statuses monitored by the detecting circuit;

an LED indicator coupled to the LED indicator controller for displaying a plurality of statuses according to the connection statuses from the LED indicator controller; and a timer coupled to the LED indicator controller for controlling blinking of the LED indicator, wherein the first connection status, the second connection status and the third connection status are represented by "ON", "OFF" and the blinking of the LED indicator; the first connection status is represented by "ON" of the LED indicator, the second connection status is represented by "OFF" of the LED indicator, and the third connection status is represented by the blinking of the LED indicator.

2. The display device according to the claim 1, wherein the first connection status, the second connection status and third connection status are represented by different colors of the LED indicator.

3. The display device according to the claim 1, wherein the detecting circuit includes a port having a plurality of SAS PHYs.

4. The display device according to the claim 1, wherein the detecting circuit includes a SAS wide port.

5. The display device according to the claim 1, wherein at least one of the two systems is a host computer system.

6. The display device according to the claim 1, wherein at least one of the two systems is a Redundant Array of Independent Disk (RAID) system.

7. The display device according to the claim 1, wherein at least one of the two system is a Just a Bundle of Drives (JBOD) system.

8. The display device according to the claim 1, wherein the detecting circuit is an I/O controller.

9. The display device according to the claim 1, wherein the detecting circuit is a SAS I/O controller.

10. The display device according to the claim 1, wherein the detecting circuit is a SAS expander.

11. The display device according to the claim 1, wherein the communication links constitute the communication channel between the two systems.

12. The display device according to the claim 1, wherein the LED indicator controller is a micro processing unit.

13. The display device according to the claim 1, wherein the LED indicator controller is a programmable logic device (PLD).

14. A method for indicating connection statuses of a communication channel provided between two systems, the communication channel having a plurality of PHY portions defining a plurality of communication links therein, the method comprising the steps of:

a detecting circuit detecting a plurality of link statuses of the communication links, the detecting circuit thereby monitoring a link status of each communication link one independent of the other;

an light emitting diode (LED) indicator controller determining the connection statuses according to independent variations of the link statuses monitored by the detecting circuit, wherein the communication channel comprises a plurality of connection statuses including: a first connection status indicating an "ON" state for all the link statuses, a second connection status indicating an "OFF" state for all the link statuses, and a third connection status indicating an "ON" state for at least one of the link statuses and an "OFF" state for at least one other of the link statuses; and an LED indicator displaying a plurality of statuses according to the connection statuses from the LED indicator controller, wherein the first connection status is represented by "ON" of the LED indicator, the second connection status is represented by "OFF" of the LED indicator, and the third connection status is represented by the blinking of the LED indicator.

15. The method according to the claim 14, wherein the first connection status, the second connection status and the third connection status are represented by different colors of the LED indicator.

16. The method according to the claim 14, further comprising the step of: providing a timer coupled to the LED indicator controller for controlling blinking of the LED indicator.

17. The method according to the claim 14, wherein the detecting circuit includes a port having a plurality of SAS PHYs.

18. The method according to the claim 14, wherein the detecting circuit includes a SAS wide port.

19. The method according to the claim 14, wherein at least one of the two system is a host computer system.

20. The method according to the claim 14, wherein at least one of the two system is a Redundant Array of Independent Disk (RAID) system.

21. The method according to the claim 14, wherein at least one of the two system is a Just a Bundle of Drives (JBOD) system.

22. The method according to the claim 14, wherein the detecting circuit is an I/O controller.

23. The method according to the claim 14, wherein the detecting circuit is a SAS I/O controller.

24. The method according to the claim 14, wherein the detecting circuit is a SAS expander.

25. The method according to the claim 14, wherein the communication links constitute the communication channel between the two systems.

26. The method according to the claim 14, wherein the LED indicator controller is a micro processing unit.

27. The method according to the claim 14, wherein the LED indicator controller is a programmable logic device (PLD).

* * * * *